Feb. 7, 1956　　　R. C. WARREN　　　2,733,724
FRUIT LIFTING DEVICE
Filed May 17, 1955　　　2 Sheets-Sheet 1
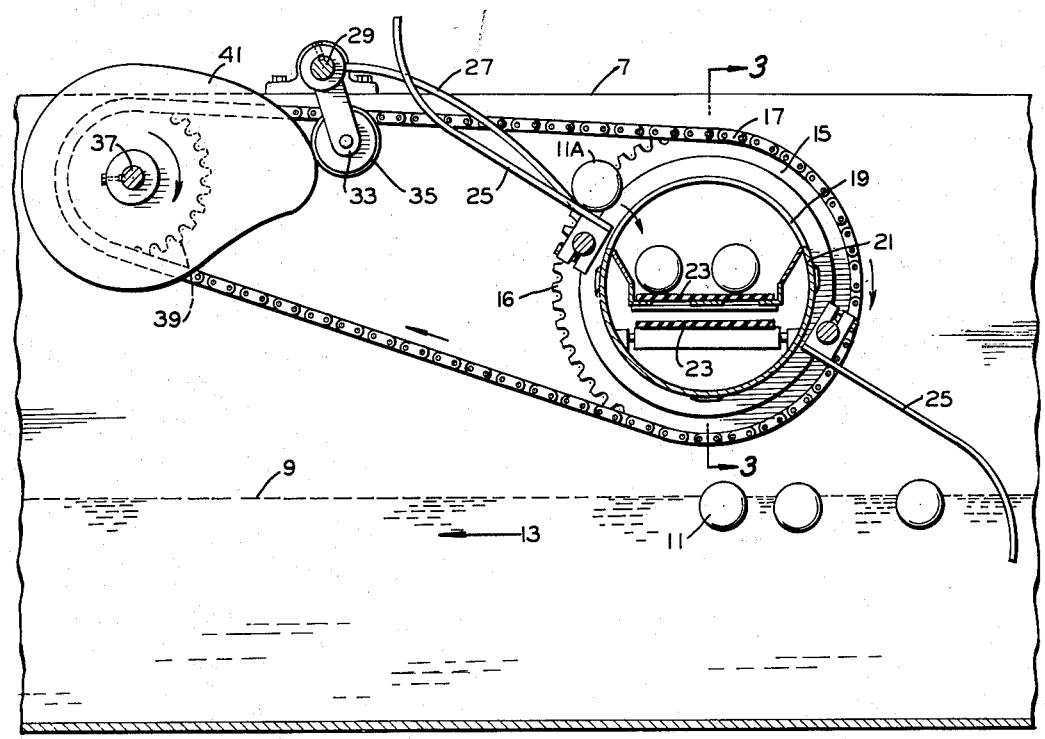
FIG_1
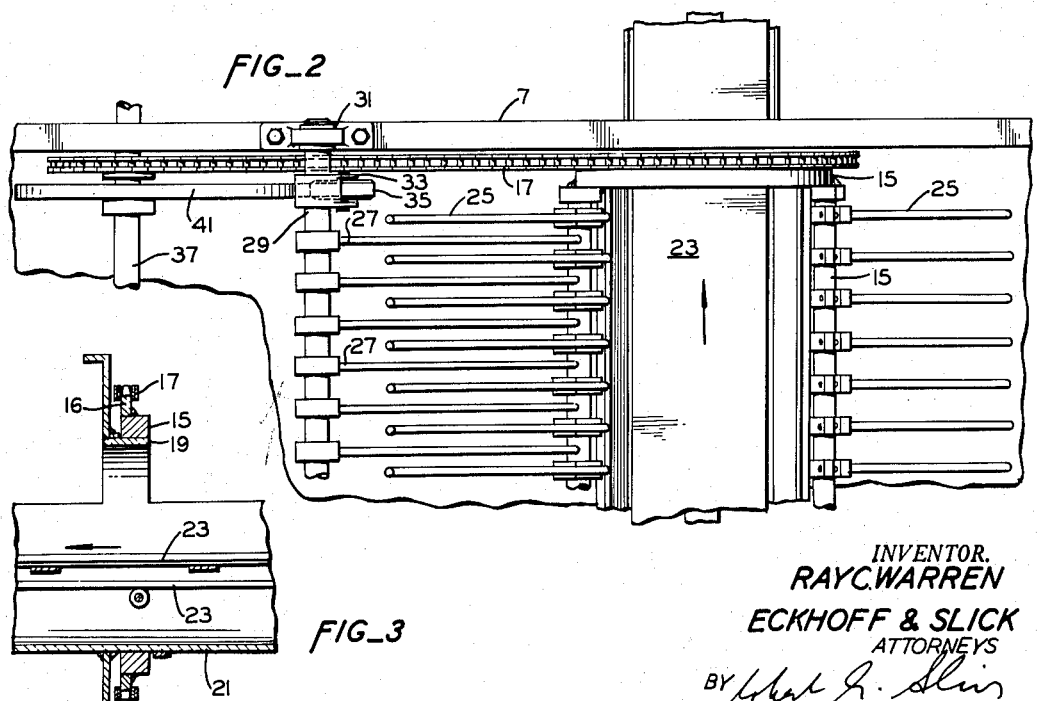
FIG_2
FIG_3
INVENTOR.
RAY C. WARREN
ECKHOFF & SLICK
ATTORNEYS
BY
A MEMBER OF THE FIRM Feb. 7, 1956  R. C. WARREN  2,733,724
FRUIT LIFTING DEVICE
Filed May 17, 1955  2 Sheets-Sheet 2
FIG_4
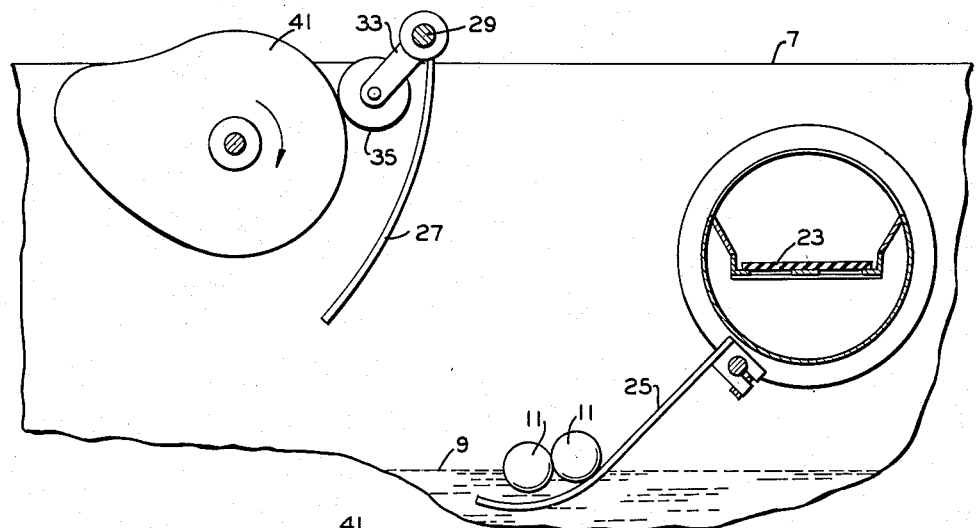
FIG_5
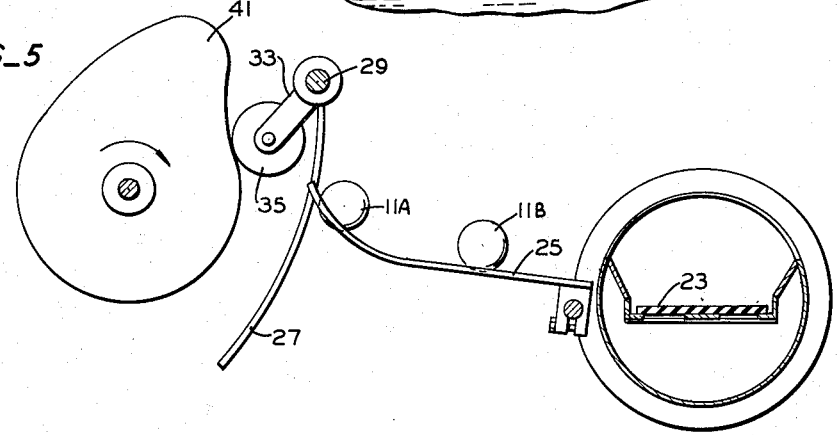
FIG_6
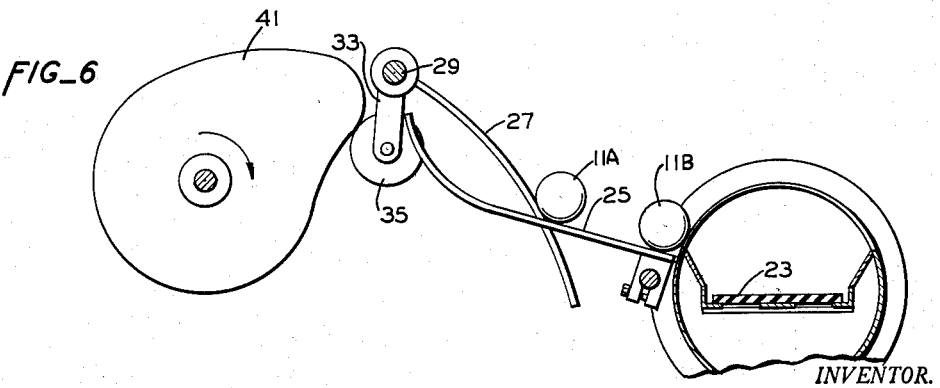
INVENTOR.
RAY C. WARREN
ECKHOFF & SLICK
ATTORNEYS
BY
A MEMBER OF THE FIRM

# United States Patent Office 2,733,724
Patented Feb. 7, 1956

2,733,724
FRUIT LIFTING DEVICE

Ray C. Warren, Woodland, Calif., assignor to Hershel California Fruit Products Co., Inc., a corporation of Illinois Application May 17, 1955, Serial No. 508,973

3 Claims. (Cl. 134—134)

This application relates to a device for picking tomatoes or other soft fruits or vegetables out of a washing tank and placing them on an endless belt or similar conveyor. The invention particularly relates to a device whereby the fruit is picked from a vessel by a series of curved teeth or tines and kept from becoming lodged between the teeth by means of a second set of tines which pass between the tines of the pick-up device.

In connection with tomato and similar fruit and vegetable handling equipment, it is customary to place the fruit in a tank to wash dirt and foreign material from the fruit and it becomes necessary to remove the floating and submerged fruit from the tank for further processing. It is customary to accomplish this by means of a device wherein the fruit is first lifted from the tank by means of a series of curved tines and then gently rolled off the tines and onto a conveyor. The difficulty with such a mechanism is that soft fruit will lodge between the tines and will not come loose until the tines are in an almost vertical position. Then the fruit will fall off and, since it has a relatively large free fall, will become squashed.

It is the object of the present invention to provide a device wherein the fruit, as it is lifted from the tank by means of tines, is gently dislodged from the tines so that it rolls down the tines rather than becoming wedged between them.

In general, the objects of the present invention are accomplished by providing a second set of tines or fingers which come between the fruit lifting tines and gently dislodge the fruit, causing it to roll from the lifting tines.

In the drawings:

Figure 1 is a side elevation in section showing the device of the present invention.

Figure 2 is a plan view of the device shown in Figure 1.

Figure 3 is a sectional view on the lines 3—3 of Figure 1.

Figures 4, 5 and 6 are diagrammatic views showing the positions of the various parts in various stages of operation.

Although it will be understood that the invention is suitable for use in connection with any soft fruits or vegetables, for convenience, the invention will be described in connection with its use in the cleaning and conveying of tomatoes.

Referring now to the drawings by reference characters, there is shown a tank 7 having water at a level 9 therein, in which is floating a number of tomatoes 11. The water is being circulated in the tank 7 generally in the direction indicated by the arrow 13. Suspended over the water level is a rotating member 15 having sprocket teeth 16 driven by the chain 17. The rotating member 15 is journaled on member 19, which in turn is supported by the trough 21. Located within the trough 21 is an endless conveying belt 23. Rotating member 15 carries a series of tines 25 thereon. Thus, as the member 15 rotates, the tines 25 sweep through the water, picking up the tomatoes 11 and elevating them, whereupon they roll off the tines and onto the belt 23. However, with very soft fruit, some fruit will lodge betweeen the tines 25 and will be carried to a position directly over the belt 23 before coming free. In other words, the fruit will not roll gently down the tines 25 as they become elevated, but will be retained by the tines 25 until directly overhead. When this happens, the fruit has a substantial free fall and becomes badly bruised or completely mashed upon hitting the belt 23.

In accordance with the present invention, a second set of tines 27 is provided which are fastened to the shaft 29. The shaft 29 is journaled for rotation, as at 31, and attached to the shaft 29 in a cam follower 33, having a roller 35 thereon. A second shaft 37 is provided having a sprocket 39 thereon. The shaft 37 may be driven from a source, not shown, and by means of the chain 17 serves as the main drive for the pick-up mechanism. Attached to the shaft 37 is a cam 41, which bears against the cam follower roller 35. As can be seen from Figure 1, the sprocket 39 has half as many teeth as the rotating member 15 so that member 15 makes one revolution for every two revolutions of the sprocket 39.

The method of operation of the device is shown in Figures 4, 5, and 6. In Figure 4, the tines 25 are just engaged with the tomatoes 11 at the surface of the water 9. Cam 41 is at a dwell portion of its circumference and therefore the tines 27 are in a retracted position. In Figure 5, the tomatoes have been lifted from the water and the tines 25 have been elevated slightly above the horizontal position. As can be seen from this drawing, a soft tomato 11A became caught between the tines and is not rolling off, while a firmer tomato 11B is gently rolling down the tines toward the conveyor. In Figure 6, the cam 41 has advanced so that the hump of the cam has pushed against the roller 35, which has caused the tines 27 to pass between the tines 25 and thus dislodge the tomato 11A and urge it gently down the tines 25 toward the conveyor 23. As can be seen from Figure 6, as cam 41 rotates further, the tines 27 will be further advanced through the tines 25, resulting in the tines being in substantially the position shown in Figure 1 when the cam is at the highest point. Thus, when the cam is at the highest point, the tines 27 pass through the tines 25 to the point that any fruit on tines 25 has been completely dislodged and is free to roll onto the conveyor 23.

I claim:

1. In a device of the character described for picking soft vegetables from a tank of water, comprising a first set of pivotally mounted rotating tines having turned terminal ends, the turn being in the direction of rotation, which dip into the water, pick up the vegetables and permit the vegetables to roll off the tines when the tines are raised above a horizontal position, the improvement comprising a second set of pivotally mounted tines which intermesh with the first set of tines and travel upwardly through the first set of tines whereby vegetables lodged between the tines of the first set of tines will be dislodged, said second set of tines moving upwardly at a faster rate than said first set of tines during the period when the two sets of tines are intermeshed, the pivotal mounting of the second set of tines being at a higher level than the pivotal mounting of the first set of tines.

2. The device of claim 1 wherein the first set of tines has a concave curvature in its direction of travel and the second set of tines has a convex curvature in its direction of forward travel and wherein the second set of tines initially intermeshes with the first set of tines at the periphery of the first set of tines and wherein the point of intersection of the two sets of tines moves gradually to near the center of rotation of the first set of tines.

3. The device of claim 1 wherein the second set of tines are actuated by a cam.

References Cited in the file of this patent

UNITED STATES PATENTS

| | | |
|---|---|---|
| 1,892,670 | Jaeger | Jan. 3, 1933 |
| 1,964,152 | Hansen | June 26, 1934 |
| 1,983,906 | Jones | Dec. 11, 1934 |
| 2,442,484 | Chamberlin | June 1, 1948 |